United States Patent [19]

Sochor

[11] 4,296,444
[45] Oct. 20, 1981

[54] INDUCTIVE SIGNAL TRANSDUCER SUPPLY CIRCUIT PARTICULARLY FOR VIDEO RECORDING USE

[75] Inventor: Josef Sochor, Darmstadt, Fed. Rep. of Germany

[73] Assignee: Robert Bosch GmbH, Stuttgart, Fed. Rep. of Germany

[21] Appl. No.: 117,432

[22] Filed: Feb. 1, 1980

Related U.S. Application Data

[63] Continuation-in-part of Ser. No. 929,938, Aug. 1, 1978, abandoned.

[30] Foreign Application Priority Data

Aug. 6, 1977 [DE] Fed. Rep. of Germany ....... 2735498

[51] Int. Cl.³ .......................... G11B 5/45; G11B 5/02
[52] U.S. Cl. ......................................... 360/65; 360/68
[58] Field of Search .................... 360/65, 68, 30, 137, 360/46

[56] References Cited

U.S. PATENT DOCUMENTS

| | | | |
|---|---|---|---|
| 2,867,693 | 1/1959 | Raisbeck | 360/65 |
| 3,007,010 | 10/1961 | Erath et al. | 310/65 |
| 3,188,616 | 6/1965 | Simon | 360/65 |
| 3,316,360 | 4/1967 | Coleman, Jr. et al. | 360/65 |
| 3,524,017 | 8/1970 | Pezirtzoglou | 360/45 |
| 3,927,420 | 12/1975 | Hayashi et al. | 360/65 |

OTHER PUBLICATIONS

"Electromagnetic Waves & Radiating Systems"-E. C. Jordan, Prentice-Hall Electrical Engr. Series, Eighth Printing, Jul. 1962, pp. 232 & 233.

*Primary Examiner*—Vincent P. Canney
*Attorney, Agent, or Firm*—Frishauf, Holtz, Goodman & Woodward

[57] ABSTRACT

To simplify coupling of a video recording transducer to a recording network, and to improve the fidelity of the signals as actually recorded with respect to the signals applied to the recording network, an amplifier, preferably a current amplifier including emitter-coupled transistors, is connected between a current-supplied compensating network and the transducer, the connection being through a short cable, preferably a coaxial cable which has a length substantially less than the wave length of the signals to be recorded, so that the overall response of the compensating network-amplifier-cable-transducer will be essentially linear with respect to the signals to be recorded.

7 Claims, 3 Drawing Figures

INDUCTIVE SIGNAL TRANSDUCER SUPPLY CIRCUIT PARTICULARLY FOR VIDEO RECORDING USE

REFERENCE TO RELATED PUBLICATION

This application is a continuation-in-part of my earlier application Ser. No. 929,938, filed Aug. 1, 1978, abandoned.

U.S. Pat. No. 3,524,017, Pezirtzoglou.

The present invention relates to a coupling circuit to couple an inductive signal transducer, typically for video recording use, to a modulator, and to compensation for distortion of signals due to the characteristics of the transducer.

BACKGROUND AND PRIOR ART

It has previously been proposed to compensate for distortion due to the characteristics of video transducers by connecting signals to be recorded by the transducer thereto over a compensating network including an amplifier. When recording high-frequency signals by means of an electromagnetic transducer, for example when recording video signals, it is necessary to so modify the current in the transducer head that the recorded signals will correspond to the desired signals to as close a degree as possible. An undulating current is necessary when recording video signals which are frequency-modulated. The quality of recording also substantially depends on the faithful reproduction of the wave shape of the signal to be recorded—which is particularly important when recording digital or pulse-type, square wave signals. The winding of the magnetic transducer head of video transducers has a highly inductive component which, upon connection to an amplifier which provides a square wave output voltage, requires compensation so that the actual signal to be recorded will have a wave shape which closely approximates that of the output signal. The referenced U.S. Pat. No. 3,524,017, Pezirtzoglou, of Aug. 11, 1970, describes a circuit arrangement in which a compensation network is connected in advance of the winding of the transducer head, typically a magnetic tape recording head. This transducer is connected to the output of an amplifier by means of a coaxial cable, as customary, and when developing the compensation network, it was primarily considered to so design the network that the input thereof, and hence the input of the combination of the transducer-network, has a real or positive resistance which corresponds essentially to the impedance of the coaxial cable. It is intended that the current through the winding of the transducer should, thereby, have the same square wave shape as the voltage supplied by the output amplifier.

It has been found that the aim of faithful reproduction of the wave shape of the current to the output voltage cannot be obtained at all times, and usually only very approximately so. The power output requirements placed on the amplifier are high.

THE INVENTION

It is an object to improve the linearity with respect to frequency of recording of essentially digital ON-OFF pulse signals of frequency up to, for example, 40 mHz by means of electromagnetic recording heads, typically video recording heads, by providing a circuit which is simple, requires little power, and results in improved recorded fidelity.

Briefly, an amplifier is connected between the compensation network and the inductive transducer, and the connecting cable between the output of the amplifier and the transducer has a length which is substantially less than the wave length of the signals being applied to the transducer e.g., 1/100th thereof. The compensating network which, contrary to the prior art, is connected in advance of the amplifier, has a current applied thereto which corresponds to the signals which are to be recorded. The compensating network itself has a frequency-amplitude characteristic which is opposite to that of the recording transducer in combination with the circuit elements connected to the transducer. The amplifier, preferably, is a transistor current amplifier connected as an emitter-follower; it may be combined with the compensating network into a single circuit unit or network.

Placing the amplifier between the compensating network and the transducer, and then connecting the transducer to this amplifier through a very short cable, has the substantial advantage that the wave shape of the current—with respect to time—will be very close to that of the supply signal. The amplifier itself need not be of high power capability, and of substantially lesser power output than that of prior art amplifiers for similar purposes.

The system also permits associating the amplifier and the transducer physically closely together since the cable, typically a coaxial cable connecting the amplifier and transducer together, is substantially shorter than the wave length of the signal. The equivalent network of the coaxial cable then appears, essentially, only as an additional capacity value which can be compensated in the compensation network.

The signals being applied to the compensating network are preferably current signals, and the compensating network is essentially a current-responsive network.

Drawings, illustrating a preferred example, wherein.

Figure 1:
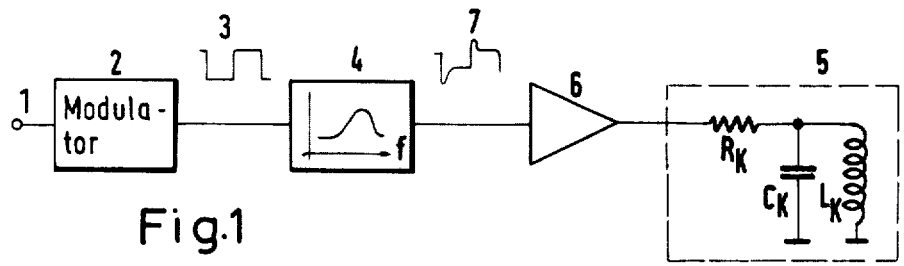
FIG. 1 illustrates a general block diagram of the system.

Signals to be recorded are applied at terminal 1 to a modulator 2 (FIG. 1). Modulator 2 frequency-modulates the signals to terminal 1 on a carrier. The output signals from modulator 2 are illustrated at 3, showing an undulating, essentially square-wave signal. The output from modulator 2 is connected to a compensating network 4, which has a transfer function of amplitude vs. frequency which is illustrated, generally, within the block symbolizing the compensating network. The compensating network, essentially, is a band-pass filter which has a frequency-dependent portion and a frequency-independent portion, that is, equally passing all frequencies without special attenuation or enhancement within the operating range of the filter. The transfer function of the compensating network increases with increasing frequency; the change in slope, that is, the knee of the increasing frequency curve, is placed approximately at the frequency which is the limit frequency of the low-pass filter effectively formed by the circuit of the transducer or recording head 5.

Amplifier 6 is connected to the output of compensation network 4. This amplifier provides the primary output power which is needed to store the signals. The output of amplifier 6 is connected to transducer 5 which, in FIG. 1, is shown in its basic equivalent circuit. The equivalent circuit has an inductance $L_K$, a resistance $R_K$, and a capacitance $C_K$. The resistance $R_K$ also includes the output resistance of the amplifier 6 which is not infinitely small. The usual stray or leakage capacities are contained in the capacity $C_K$. The capacity of the connecting cable, typically a coaxial connecting cable, is likewise included in the lumped capacity $C_K$.

The compensating network 4 emphasizes higher frequencies of the signal 3. Thus, the output signal from compensating network 4 will be about that illustrated at curve 7.

Figure 2:
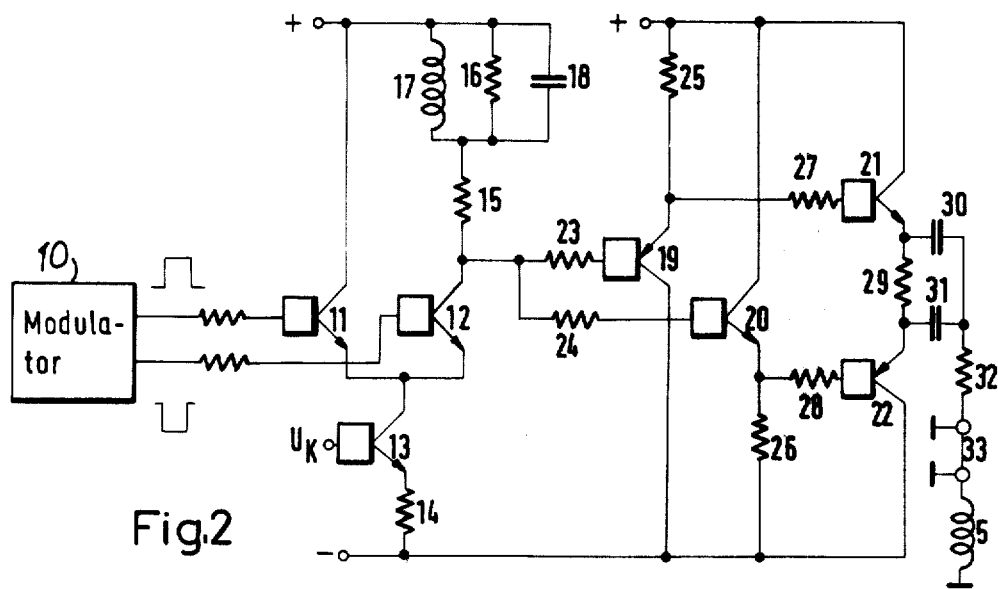
FIG. 2 is a detailed circuit diagram of the system of FIG. 1.

The frequency-dependent characteristics of the transducer 5 cause change of current through the windings of the transducer with respect to the applied voltage. It is thus particularly advantageous to so arrange the compensating network that it has a current applied thereto which corresponds to the signals to be recorded and to apply the voltage drop at the compensation network to the transducer 5 over the amplifier 6. Such a circuit is shown in FIG. 2.

A modulator 10 (FIG. 2) has two complementary outputs at which pulse-type square wave signals are available, 180° out-of-phase. The output signals from modulator 10 are connected, possibly through suitable amplifiers, to the bases of two transistors 11, 12, which are alternately conductive. Transistors 11, 12 are emitter-coupled and operate as switching transistors. A third transistor 13 has a reference voltage $U_K$ applied to its control terminal and operates as a constant current source. An emitter-resistor 14 couples transistor 13 to the negative or reference terminal of a source. The voltage $U_K$ is adjustable to provide a suitable constant reference current through transistor 13.

Transistors 11, 12 are alternately conductive as determined by the modulator 10. The collector of transistor 11 is directly connected to the positive terminal of the source; the collector of transistor 12 is connected to the positive terminal of the source through a collector resistor 15 and a parallel network including a resistor 16, an inductance 17, and a capacitor 18. The elements 15, 16, 17 form the compensation network to which a current corresponding to the signal to be stored is supplied through the transistor. Capacitor 18 need not be a specific capacitor element as such; in some circuit configurations, the capacity of the various switching elements and connecting network may form the necessary capacitance. Capacitor 18 thus may represent the equivalent capacity of the network. The output voltage of the compensating network is taken off the collector of transistor 12 and is applied to a push-pull amplifier which includes transistors 19, 20; 21, 22 and the respective resistors 23-29. The push-pull output amplifier, as such, is standard and need not be described in detail. All transistors of the amplifier are connected as emitter-followers. The voltage amplification, thus, is approximately one, or unity, the output resistance is low, and the power or current amplification is substantial.

The emitters of transistors 21, 22 are coupled to the output through capacitors 30, 31 and resistor 32. They are then applied through a coaxial cable 33, shown schematically, to the record/reproduce head, that is, to transducer 5, shown in FIG. 2 only as the inductance coil, the equivalent circuit having been omitted.

Figure 3:
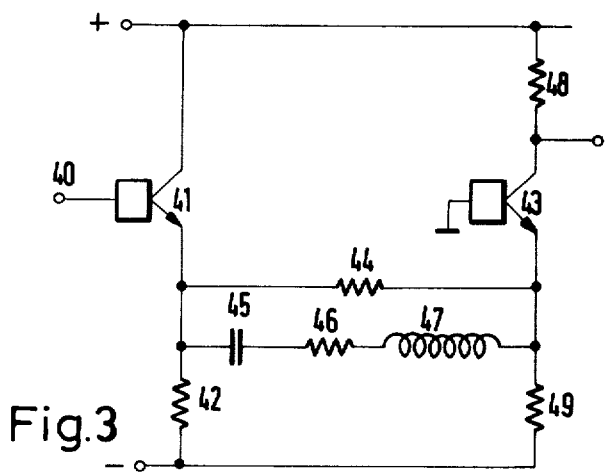
FIG. 3 is a fragmentary diagram of the system of FIG. 1, and illustrating another example of a compensating network.

FIG. 3 illustrates another embodiment of the compensation network. The signals to be stored are applied from terminal 40 to the base of a transistor 41, connected as an emitter-follower. The collector of transistor 41 is connected to the positive terminal of a supply source, the emitter is connected over resistor 42 to its negative terminal. The compensating network itself includes the resistor 44, capacitor 45, resistor 46, and inductance 47. The capacity-resistor-inductance circuit 45, 46, 47 is serially connected, resistor 44 forming a non-frequency responsive bypass. The currents flowing through resistor 44 and the series circuit 45, 46, 47 are added at the emitter of transistor 43 and the corresponding voltage drop across emitter resistor 49 will be the output signal which is available at the collector of the transistor 43. The collector is, additionally, connected through a resistor 48 to the positive supply bus. The terminal from the collector of transistor 43 corresponds to the terminal of the collector of transistor 12 (FIG. 2) and can be connected to a push-pull amplifier similar to that shown in connection with FIG. 2, that is, similar to the circuit including transistors 19-22 and resistors 23-29. The resistor 44 is a signal transfer resistor without band-pass characteristics; the network including capacitor 45, resistor 46 and inductance 47 is a resonant circuit having band-pass characteristics.

The resistor 32 (FIG. 2) preferably has the same resistance as the characteristic impedance of the coax cable 33. This permits matching the resistance of cable 33 at least at its input, so that multiple reflections are avoided.

Similar networks to those shown may be used; the transistors 11, 12 (FIG. 2) may be operated as linear amplifiers. Various other changes and modifications may be made, and features described in connection with any one of the embodiments may be used with any of the others, within the scope of the inventive concept.

For recording of signals having a maximum frequency of 40 MHz, and a length of cable 33 of 7 cm, suitable compensation networks may be of the following values:

resistor 16: 91 Ohms
inductance 17: 0.4 microhenry
capacitor 18, including network capacitances (or equivalent capacity): 5 pF, formed by capacity of collector of the transistor 11, 12 respectively.
In the network of FIG. 3: capacitor 45 (including network capacitances): 100 pF
resistor 46: 43 Ohms
inductance 47: 0.1 microhenry
resistor 44: 390 Ohms The transistors 11, 12 . . . 43 have been shown as blocks, rather than by their customary notation, to indicate, schematically that the showing of the circuit is directed to the circuit configuration where it is important, but that the transistors themselves may be transistor combinations or networks with suitable preamplifiers, Darlington-connected units, or the like, in accordance with power, polarity, and voltage requirements.

The compensating network 4 has the transfer function shown therein. As is clearly apparent, the amplitude of transfer for a lower frequency is less than those for a higher frequency and, as the frequency rises beyond a certain value, the amplitude of the output signal drops off. Thus, the transfer function, or amplification of network 4 is nonlinear with respect to frequency. If essentially square wave pulses as shown in FIGS. 1 and 3 are applied to the network 4, these pulses will—in Fourier analysis—have a higher frequency content than a sine wave signal. These high frequency portions of the pulse signal 3 are particularly apparent at the time of the start and a stop of the pulse, that is, at the flanks of the signal. If these higher frequencies are more amplified in network 4 than the lower ones, then the output wave as shown at 7 in FIG. 1 will be obtained, since the higher frequency components are emphasized, as is apparent from the transfer function given within the block representation of network 4.

The circuits of FIGS. 2 and 3 accomplish this object. Transistors 11, 12 and 13 (FIG. 2) form a difference amplifier, the output of which is available at the collector of transistor 12. The output is a high resistance output, that is, the output signal is present in form of current. The output voltage of the difference amplifier is obtained from the voltage drop of the current on the network comprising resistors 15, 16 and the tank circuit 17, 18. At low frequencies, the inductive impedance of coil 17 can be neglected with respect to the resistance of resistor 15, so that the horizontal portion of the transfer characteristic shown within the block 4 (FIG. 1) is obtained. As the frequency increases, the inductance of the coil becomes effective so that overall impedance of the network increases, which increases the signal voltage at the collector of transistor 12. At the maximum of the curve, the impedance of coil 17 and of the capacitor 18 are high with respect to the resistance of resistor 16, so that, for the maximum, the resistance of resistors 15, 16 determines the output signals. As the frequency increases, the effective impedance of capacitor determines the output signal. As the frequency increases, the effective impedance of capacitor 18 decreases, so that the signal voltage at the collector of transistor 12 again drops. The difference amplifier 11, 12, 13 has good characteristics with respect to stability, linearity, and economy of components, while providing a useful high-resistance output, which can be applied in form of a current to the output network. Transistor 13, which has the reference voltage $U_K$ applied thereto provides a suitable constant reference current to both transistors 11, 12.

The configuration formed by the transistors 11, 12, and 13 operates as a difference amplifier and has the following advantages:

1. the output (collector of transistor 12) has a high impedance,
2. the output current is adjustable by adjusting the level of a signal $U_K$ applied to the base of transistor 13 which enables a remote-control of the level of signal current to be supplied to the transducer,
3. The circuit can operate as a limiter, in order to achieve an output current amplitude independent of the amplitude and possible disturbances of the input signal.

The circuit according to FIG. 3 has the same transfer function as that of FIG. 2, in which, however, a series resonant circuit formed by capacitor 45, inductance 47, and resistor 46 is used, connected in parallel to resistor 44. The circuit 44–47 is connected between, i.e. couples, two amplifier stages, in which the signal applied at terminal 40 can be derived from a single-ended output modulator such as modulator 2 (FIG. 1) and the signal from the collector of transistor 43 can be applied to a further amplifier 6 and then to the network 5.

Above and below the resonant frequency of the series circuit 45–47 the impedance of the series circuit is relatively high with respect to that of resistor 44, so that the amplification of the circuit of FIG. 3 is determined essentially only by the value of the resistor 44. As the frequency increases to approach the resonant frequency, the impedance of the tank circuit 45/47 decreases so that, effectively, the resistance of resistor 46 is placed in parallel to that of the resistor 44, increasing the coupling between the transistor stages 41, 43, and hence increasing the output for transistor 43. In effect, at the resonant frequency, the amplification of the circuit 41–44, 45, 46, 47–43 increases at the resonant frequency. The circuit is not sharply resonant, but rather has a transfer curve as shown within the block 4 (FIG. 1) to provide the transfer function there shown.

The signals derived from modulator 2 can have various origins; for example, they may be data signal, or video signal, the frequency of which, however, can vary widely. In pulse-type signals, as shown in FIG. 3, recording is not by analog recording but rather by recording essentially square wave signals, which effectively excludes amplitude nonlinearities of the magnetic tape as such. The wave shape, that is, the essentially square wave should be retained. By emphasizing high frequency components within the wave form to be recorded, and providing a compensating network which does so—compare waves 3 and 7, FIG. 1—the wave form of the actual recorded signal will closely approach that of the wave form of the signal derived from modulator 2.

I claim:

1. Inductive signal transducer supply circuit, particularly for video recording use, to supply signals of essentially square wave pulse form to an inductive transducer to effect a recording in essentially square wave form with minimum wave shape degradation, as the frequency of applied pulse signals and hence the wave length thereof varies, said circuit comprising the combination of a frequency-dependent compensating network (4) connected in advance of the inductive transducer (5), emphasizing high frequency components of the signal;

a current supply circuit (11, 12, 13; 41) supplying current to the compensating network in accordance with the applied signals;

and a current amplifier (6; 19–29) connected between the compensation network (4) and the inductive transducer (5) and supplying energizing current to said transducer;

with a connecting cable (33) between the output of the amplifier (6; 19–29) and the input to the transducer (5), said cable having a length which is substantially less than the minimum wave length of the supply signals being applied to the transducer, and presenting essentially only capacitative impedance;

and wherein the compensating network has a frequency component-output signal transfer characteristic which is the inverse of a series network comprising the amplifier and the connecting cable and the transducer.

2. Circuit according to claim 1, wherein the frequency transfer characteristic of the compensating network (4) includes a component which passes all frequencies essentially uniformly and a component in parallel thereto which enhances the passage of higher frequencies.

3. Circuit according to claim 1, wherein the amplifier is a transistor amplifier connected as an emitter-follower.

4. Circuit according to claim 1, wherein the amplifier is a transistor amplifier connected as an emitter-follower, and the compensating network is combined with the amplifier into a single circuit unit.

5. Circuit according to claim 4, wherein the frequency transfer characteristic of the compensating network (4) includes a component which passes all frequencies essentially uniformly and a component in parallel thereto which enhances the passage of higher frequencies.

6. Circuit according to claim 1 wherein the signals have a frequency of up to about 40 MHz.

7. Circuit according to claim 1, wherein the length of the connecting cable is no more than 1/100 of the wave length of the applied signals.

* * * * *